July 15, 1952  J. R. MILES  2,603,128
OPTICAL SYSTEM FOR OBJECTIVES AND EYEPIECES
Filed July 10, 1951
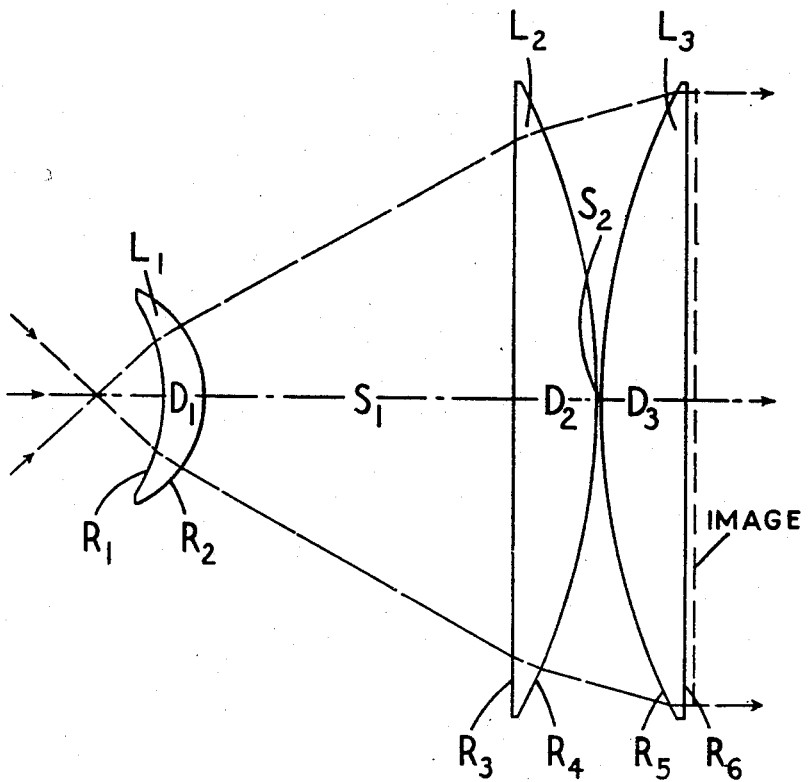
John R. Miles
INVENTOR.

Patented July 15, 1952

2,603,128

UNITED STATES PATENT OFFICE 2,603,128

OPTICAL SYSTEM FOR OBJECTIVES AND EYEPIECES

John R. Miles, Des Plaines, Ill., assignor to Chicago Aerial Survey Company, Chicago, Ill., a corporation of Illinois Application July 10, 1951, Serial No. 235,921

2 Claims. (Cl. 88—57)

The present invention relates to optical systems for objectives and eyepieces for visual use in instruments, such as periscopes, view-finders and telescopes.

Optical systems of this type, as heretofore constructed for use on periscopes and the like, contained an objectionable amount of distortion, field curvature, and lateral chromatic abberation, when used over a field of 85° or more. Also, heretofore, either unusual glasses or aspheric surfaces were used in the correction of distortion, when a substantially distortion-corrected field of 85° or more was attempted.

Additionally, heretofore, when a substantially distortion-corrected field of 85° or more was attempted, the real image formed by such visual systems was within the system, which made it unsatisfactory for use in connection with a reticle or grid.

With the present optical system, however, a correction for distortion, field curvature, and chromatic aberration has been attained for a field of over 85° in which the distortion correction, combined with color correction, is superior to previous systems. In addition, the present system uses spherical surfaces, and glasses which are readily available.

Accordingly, an object of the invention is to provide a novel optical system that produces a better correction for distortion, field curvature, and lateral chromatic aberration, when used for a visual field of 85° or more.

Another object is to provide a novel optical system for a visual field of 85° or more, using spherical surfaces and readily available glasses, in which the distortion, field curvature, and lateral chomatic aberration are substantially corrected.

Another object is to provide a novel optical system for a distortion-corrected visual field of 85° or more, in which the real image is formed outside the system, for use with reticles or grids in the image.

The above, and other objects and advantages of the present invention, will appear more fully hereinafter from a consideration of the detailed description and claims which follow, taken together with the accompanying drawing, wherein one embodiment of the invention is illustrated. It is to be expressly understood, however, that the drawing is for the purpose of illustration only, and is not designed as a definition of the limits of the invention. Reference for this latter purpose should be had to the appended claims.

In the drawing is illustrated one embodiment of the present invention, wherein the three components used are generally referred to as $L_1$, $L_2$ and $L_3$, designed, shaped and proportioned according to the following formula, in which the kinds of glass of the lenses $L_1$, $L_2$ and $L^3$ are determined by the refractive indices $N_D$ and Abbe V numbers of the line D of the solar spectrum:

| Lenses | Radii | Thicknesses and Spaces | Refractive Indices— $N_D$ | V |
|---|---|---|---|---|
| $L_1$ | $R_1 = -50$ | $D_1 = 11.0$ | 1.638 | 55.5 |
|  | $R_2 = -32$ | $S_1 = 84.7$ |  |  |
| $L_2$ | $R_3 = \infty$ | $D_2 = 23.6$ | 1.520 | 62.0 |
|  | $R_4 = -185.7$ | $S_2 = .4$ |  |  |
| $L_3$ | $R_5 = +185.7$ | $D_3 = 23.6$ | 1.520 | 62.0 |
|  | $R_6 = \infty$ |  |  |  |

Field of view = 85°. Linear field size = 167.2.
Equivalent focal length = 100 units.

In the above formula, R is the radius of curvature of the refracting surface, D is the axial thickness of the lens element between the refracting surfaces, S is the space between the lenses, $N_D$ is the index of refraction in Sodium light, and V is the well known reciprocal dispersion-ratio.

The above formula operates particularly well as a periscope objective, where the total magnification is approximately .33X, and where the distance to the back pupil is over 1000 units. Used under these conditions, the distortion is approximately one-half that of any known previous system, and the lateral color is approximately one-third, while the astigmatism and field curvature at the edge of the field is approximately one-fourth.

In optical systems of this type, the two principal requirements for lens powers are: firstly, to form a real image; and secondly, to refract the principal rays back to the axis after passing through the system. The first lens $L_1$, which is meniscus, contributes most of the first requirement, and the lenses $L_2$ and $L_3$ contribute most of the second requirement. The corrections, however, are produced by the balance of shapes, powers, and spaces of all the lenses.

What is claimed is:

1. An optical system for objectives and eyepieces comprising at least three lenses in equivalent axial alignment, two of said lenses being substantially according to the following formula, taking the focal length "f" of said system at 100 units, and the lens members as $L_1$, $L_2$ and $L_3$:

| Lenses | Radii | Thicknesses and Spaces | Refractive Indices— $N_D$ | V |
|---|---|---|---|---|
| $L_1$ | $R_1 = -50$ | $D_1 = 11.0$ | 1.638 | 55.5 |
| | $R_2 = -32$ | $S_1 = 84.7$ | | |
| $L_2$ | $R_3 = \infty$ | $D_2 = 23.6$ | 1.520 | 62.0 |
| | $R_4 = -185.7$ | $S_2 = .4$ | | |
| $L_3$ | $R_5 = +185.7$ | $D_3 = 23.6$ | 1.520 | 62.0 |
| | $R_6 = \infty$ | | | | in which $R_1$, $R_2$, $R_3$, $R_4$, $R_5$ and $R_6$ are vertex radii of curvature; $D_1$, $D_2$, and $D_3$, the axial lens thicknesses; $S_1$ and $S_2$, the spaces between the lenses; $N_D$ is the index of refraction in sodium light, and V is the well known value of the reciprocal dispersion ratio; with the rear aperture stop at infinity, with a relative aperture of less than F:10 for the complete system, and with an entrance field of view of approximately 85°, and whereby the rectilinear distortion is substantially corrected, and the other aberrations of the system are held within practical limits.

2. An optical system for objectives and eyepieces comprising at least three lenses in which the first principal lens unit has the vertex radius of curvature of its first principal refracting surface concave and numerically between .3 times and .7 times the focal length of the complete system, and in which the first principal lens unit has the vertex radius of curvature of its second principal refracting surface convex and numerically between .25 times and .40 times the focal length of the complete system, and in which the second principal lens unit has the vertex radius of curvature of its first principal refracting surface at least numerically 4 times the focal length of the complete system, and in which the second principal lens unit has the vertex radius of curvature of its second principal refracting surface convex and numerically between 1.6 times and 2.2 times the focal length of the complete system, and in which the third principal lens unit has its first principal refracting surface convex and numerically between 1.6 times and 2.2 times the focal length of the complete system, and in which the third principal lens unit has its second principal refracting surface at least numerically 4 times the focal length of the complete system, and in which the separation, or equivalent separation, of the second principal refracting surface of the first principal lens unit, and the first principal refracting surface of the second principal lens unit, is between .6 times and 1.2 times the focal length of the complete system, and in which the separation, or equivalent separation, of the last two principal lens unit is not over .3 times the focal length of the complete system.

JOHN R. MILES.

REFERENCES CITED

The following references are of record in the file of this patent:

UNITED STATES PATENTS

| Number | Name | Date |
|---|---|---|
| 1,159,233 | Konig | Nov. 2, 1915 |
| 2,547,958 | Miles | Apr. 10, 1951 |

FOREIGN PATENTS

| Number | Country | Date |
|---|---|---|
| 270,274 | Germany | Feb. 11, 1914 |
| 947,068 | France | Jan. 3, 1949 |